(12) United States Patent
De Graaf et al.

(10) Patent No.: US 11,312,096 B2
(45) Date of Patent: Apr. 26, 2022

(54) TIRE BUILDING DRUM AND METHOD FOR TIRE BUILDING

(71) Applicant: VMI HOLLAND B.V., Epe (NL)

(72) Inventors: Martin De Graaf, Epe (NL); Dave Papot, Epe (NL)

(73) Assignee: VMI HOLLAND B.V.

(*) Notice: Subject to any disclaimer, the term of this patent is extended or adjusted under 35 U.S.C. 154(b) by 0 days.

(21) Appl. No.: 17/279,515

(22) PCT Filed: Oct. 4, 2019

(86) PCT No.: PCT/NL2019/050664
§ 371 (c)(1),
(2) Date: Mar. 24, 2021

(87) PCT Pub. No.: WO2020/080934
PCT Pub. Date: Apr. 23, 2020

(65) Prior Publication Data
US 2021/0339493 A1 Nov. 4, 2021

(30) Foreign Application Priority Data

Oct. 19, 2018 (NL) ..................................... 2021842

(51) Int. Cl.
*B29D 30/24* (2006.01)
*B29D 30/26* (2006.01)

(52) U.S. Cl.
CPC ........... *B29D 30/26* (2013.01); *B29D 30/244* (2013.01); *B29D 30/245* (2013.01)

(58) Field of Classification Search
CPC ...... B29D 30/24; B29D 30/26; B29D 30/244; B29D 30/245; B29D 30/246; B29D 30/247; B29D 30/248; B29D 2030/2657
See application file for complete search history.

(56) References Cited

U.S. PATENT DOCUMENTS 3,178,331 A 4/1965 Bishop et al. ............... 156/41.5
4,045,277 A * 8/1977 Habert ................. B29D 30/247
156/417

(Continued)

FOREIGN PATENT DOCUMENTS

CN 1233555 11/1999 ............. B29D 30/32
CN 1410256 4/2003 ............. B29D 30/24

(Continued)

OTHER PUBLICATIONS

First Office Action issued in Chinese Patent Appln. Serial No. 201910990738.X, dated Jun. 25, 2021, with English translation, 11 pages.

(Continued)

*Primary Examiner* — Geoffrey L Knable
(74) *Attorney, Agent, or Firm* — Hayes Soloway P.C.

(57) ABSTRACT

A tire building drum has a crown section with crown segments which are movable from a crown-down position into a crown-up position, wherein the crown segments together form a crown surface facing outwards in the radial direction, a leading edge and a shoulder that forms the transition from the crown surface to the leading edge, wherein the shoulder leaves a gap, wherein the tire building drum further includes a plurality of support members that extend in said gap, wherein each crown segment has a first side and a second side, wherein each crown segment further includes one or more guide channels, wherein each guide channel is arranged for receiving a respective one of the plurality of support members in the respective crown segment between the first side and the second side. Also disclosed is a method for tire building using the aforementioned tire building drum.

16 Claims, 9 Drawing Sheets

(56) References Cited

U.S. PATENT DOCUMENTS

| | | | |
|---|---|---|---|
| 4,131,500 A | 12/1978 | Wilde et al. | 156/131 |
| 4,149,927 A * | 4/1979 | Lauer, Jr. | B29D 30/32 |
| | | | 156/415 |
| 7,144,467 B2 | 12/2006 | Reding et al. | 156/132 |
| 10,611,112 B2 | 4/2020 | Montgomery | B29D 30/245 |
| 2002/0007917 A1 | 1/2002 | Cordillat et al. | 156/414 |
| 2003/0056879 A1 | 3/2003 | Currie et al. | 156/110.1 |
| 2003/0056904 A1 | 3/2003 | Currie et al. | 156/417 |
| 2012/0168087 A1 | 7/2012 | Byerley | 156/417 |
| 2015/0000845 A1* | 1/2015 | Gervais | B29D 30/26 |
| | | | 156/419 |
| 2015/0367587 A1 | 12/2015 | Kon et al. | B29D 30/08 |
| 2020/0108577 A1 | 4/2020 | De Graaf et al. | B29D 30/247 |

FOREIGN PATENT DOCUMENTS

| | | | | |
|---|---|---|---|---|
| CN | 1410257 | | 4/2003 | B29D 30/36 |
| CN | 103963330 | | 8/2014 | B29D 30/26 |
| CN | 104995034 | | 10/2015 | B60C 5/01 |
| CN | 207594372 | | 7/2018 | B29D 30/24 |
| CN | 110198830 | | 9/2019 | B29D 30/24 |
| CN | 211334676 | | 8/2020 | B29D 30/24 |
| DE | 1 579 056 | | 12/1970 | B29H 17/16 |
| EP | 1 295 702 | | 3/2003 | B29D 30/24 |
| EP | 2 698 244 | | 2/2014 | B29D 30/24 |
| GB | 2 038 730 | | 7/1980 | B29H 17/22 |
| JP | 5619502 | | 9/2014 | B29D 30/24 |
| JP | 2018-12333 | | 1/2018 | B29D 30/24 |
| KR | 2003-0025845 | | 3/2003 | B29D 30/24 |
| KR | 2003-0025847 | | 3/2003 | B29D 30/24 |
| KR | 10-0559063 | | 3/2006 | B29D 30/24 |
| KR | 10-2019-0094177 | | 8/2019 | B29D 30/24 |
| WO | WO 2018/111091 | | 6/2018 | B29D 30/24 |
| WO | WO 2018/174708 | | 9/2018 | B29D 30/24 |
| WO | WO 2020/080934 | | 4/2020 | B29D 30/24 |

OTHER PUBLICATIONS

Decision to Grant issued in Japanese Patent Appln. Serial No. 2020-523690, dated May 10, 2021, 5pages.

Search Report issued in Netherlands Patent Appln. Serial No. 2021842, dated May 2, 2019, 11 pages.

International Preliminary Report on Patentability issued in PCT/NL2019/050664, dated Apr. 14, 2021, 7 pages.

International Search Report and Written Opinion issued in PCT/NL2019/050664, dated Mar, 9, 2020, 11 pages.

Office Action issued in Korean Patent Appln. Serial No. 10-2021-7011607, dated Jul. 20, 2021, with English translation, 11 pages.

* cited by examiner

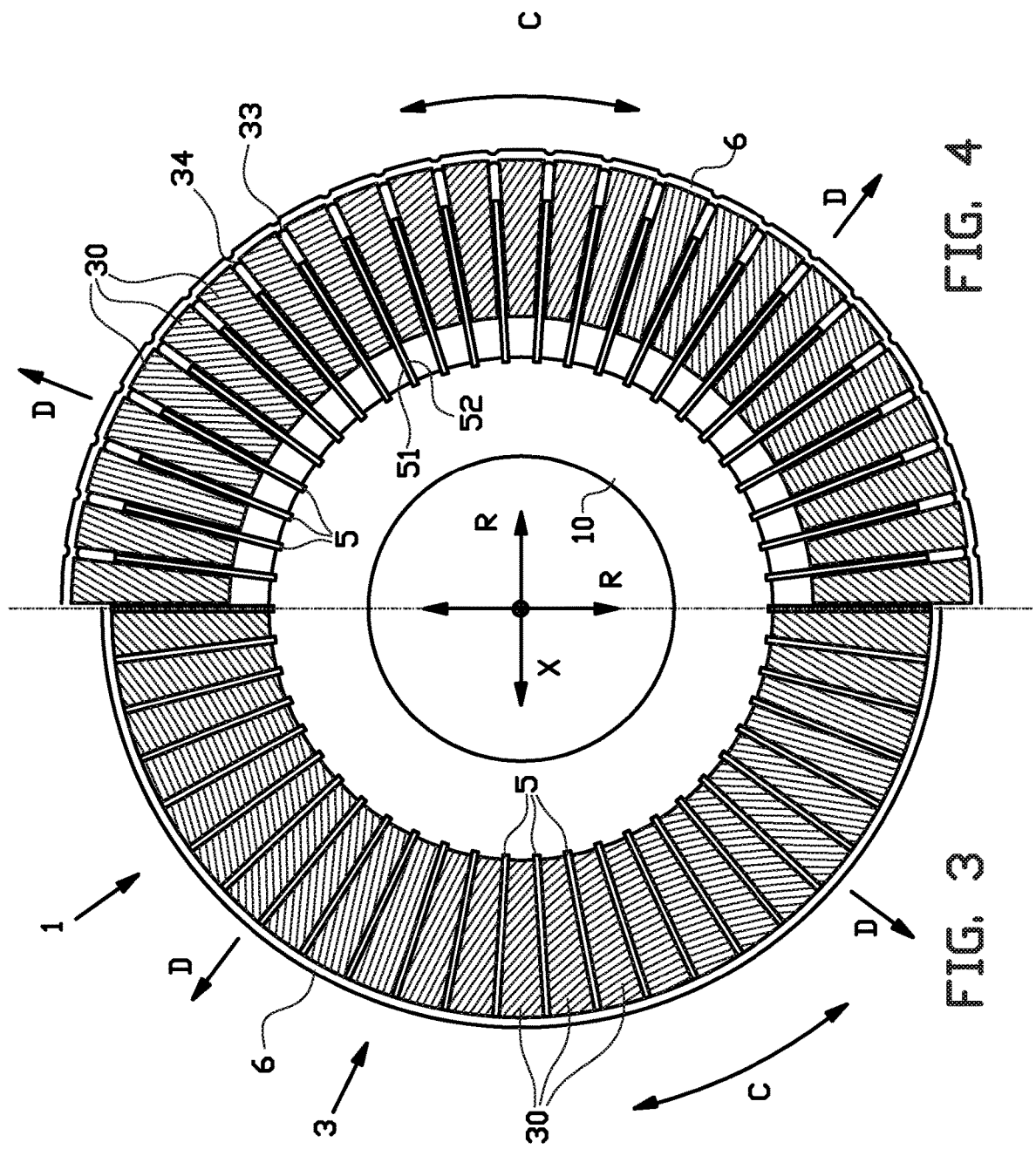

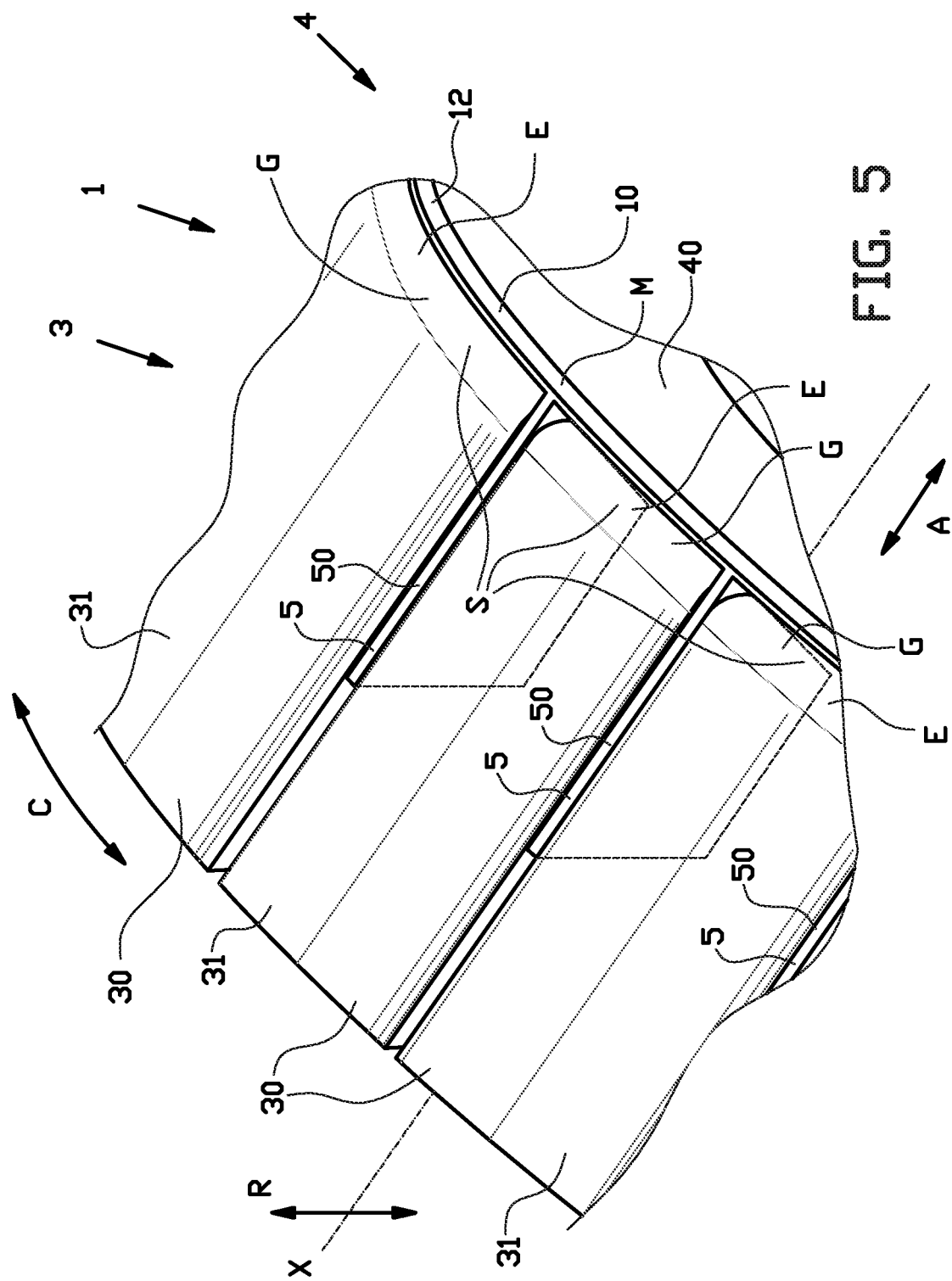

TIRE BUILDING DRUM AND METHOD FOR TIRE BUILDING

BACKGROUND

The invention relates to a tire building drum, in particular a crown drum, and a method for tire building.

WO 2018/111091 A2 discloses a tire building drum, in particular a crown drum, for single stage tire building. The tire building drum comprises two drum halves, wherein each drum half is provided with a bead-lock section, a turn-up section at the side of the bead-lock section facing in the axial direction away from the center of the drum and a crown-up section in the axial direction between the bead-lock section and the center of the drum. The crown-up section comprises a plurality of crown segments distributed circumferentially about said central axis and movable in the radial direction between a crown-down position and a crown-up position.

The tire building drum further comprises a bead-lock seal with a first end that is arranged to be mounted to the crown segments and a second end that is arranged to be mounted to the drum half at a side of the bead-lock section opposite to the crown-up section.

As the crown segments move radially outward with respect to the bead-lock section, the bead-lock seal extends from the crown segments over the bead-lock section and thereby spans the gap between the bead-lock section and the crown section.

SUMMARY OF THE INVENTION

A disadvantage of the known tire building drum is that when the crown segments are in the crown-down position, the circumferential surface of the tire building drum formed by the bead-lock section and the crown-up section is not entirely flat. In particular, the crown segments form a rounded shoulder to prevent that said crown segments damage the tire components in the crown-up position. Ideally, the radius of the rounded shoulder is considerable to provide a smooth surface for the roll-over of tire components during the turn-up. However, this rounded shoulder forms a gap in the circumferential surface of the tire building drum between the crown-up section and the bead-lock section when the crown segments are in the crown-down position. The larger the radius, the larger the gap. The gap can be problematic when applying the tire components on the tire building drum, in particular during stitching or splicing. Consequently, the quality of the tire produced on the known tire building drum may be negatively affected.

EP 1 295 702 A2 discloses a tire building drum with a center section consisting of expanding segments and fixed segments between the expanding segments. The fixed segments are provided with a generally rectangular cross section that fills the aforementioned gap. Although this partially solves the abovementioned problem, the presence of the fixed segments requires the expanding segments to be spaced apart in the contracted position, which spacing causes an even larger gap when the expanding segments are moved into the expanded position. The large gap can cause damage to the tire components when the known tire building drum is expanded.

It is an object of the present invention to provide a tire building drum and a method for tire building, wherein the quality of the tire produced on the tire building drum can be improved.

According to a first aspect, the invention provides a tire building drum comprising a base that is rotatable about a central axis extending in an axial direction, wherein the tire building drum is provided with a crown section and a bead-lock section adjacent to the crown section in the axial direction, wherein the crown section comprises a plurality of crown segments distributed in a circumferential direction about the central axis and movable with respect to the base from a crown-down position into a crown-up position in a crown-up direction with at least a vector-component in a radial direction perpendicular to the central axis, wherein the crown segments together form a crown surface facing outwards in the radial direction, a leading edge facing towards the bead-lock section in the axial direction when the crown segments are in the crown-down position and a shoulder that defines the transition from the crown surface to the leading edge, wherein the leading edge extends in a radial plane perpendicular to the central axis, wherein the shoulder leaves a gap between the plurality of crown segments and the radial plane in the axial direction, wherein the tire building drum further comprises a plurality of support members distributed in the circumferential direction and extending in said gap when the crown segments are in the crown-down position, wherein each crown segment comprises a first side and a second side opposite to the first side in the circumferential direction, wherein each crown segment further comprises one or more guide channels, wherein each guide channel is arranged for receiving a respective one of the plurality of support members in the respective crown segment between the first side and the second side.

The support members can at least partially support one or more tire components on the tire building drum at the location of the gap when the crown segments are in the crown-down position. Hence, the negative effects of the gap on the one or more tire components can be reduced. In particular, imprints as a result of the gap can be reduced or prevented all together. Consequently, the tire quality can be improved. By receiving the support members in the crown segments between the first side and the second side, said sides of the crown segments can be placed closer together in the circumferential direction. When the crown segments are placed closer together in the crown-down position, the spacing between the crown segments in the crown-up position can be reduced as well. The risk of causing damage to the tire components in the crown-up position can thus be reduced.

In a preferred embodiment the plurality of support members extend through the gap in the axial direction. The support members can therefore be designed not to interfere with axial movements of other components of the tire building drum, i.e. the axial component of the movement of the crown segments in the crown-up direction.

In another embodiment each crown segment comprises an outer surface that faces outwards in the radial direction, wherein the outer surfaces of the plurality of crown segments together form the crown surface, wherein each support member forms a support surface that extends into the gap as a continuation of the crown surface when the plurality of crown segments are in the crown-down position. The support surface can therefore lie flush or substantially flush with the crown surface to prevent abrupt transitions between the crown surface and the support surface.

In an embodiment thereof the crown surface extends at a crown-down radius with respect to the central axis, wherein the support surface extends at the same crown-down radius in the gap. The support members can therefore support the one or more tire components at the same radius as the crown segments.

In a further embodiment thereof the support surface extends parallel or substantially parallel to the axial direction. The combined support surface formed by the individual support surfaces of the plurality of support members can therefore be cylindrical or substantially cylindrical to easily receive the one or more tire components thereon.

In another embodiment the plurality of support members are fixed in the radial direction relative to the base, wherein the plurality of crown segments are movable in the crown-up direction relative to the plurality of support members. The support members can thus provide support to the one or more tire components only when the crown segments are in the crown-down position. In particular, the support members do not interfere with the shaping of the one or more tire components by the crown segments when said crown segments are in the crown-up position.

In an embodiment thereof the plurality of support members are arranged for guiding the movement of the plurality of crown segments in the crown-up direction. The support members can thus take the place of the conventional guiding elements, thereby not adding to the complexity and/or space consumption of said guiding elements.

In an unclaimed embodiment one or more of the plurality of support members are placed between the plurality of crown segments in the circumferential direction. The support members can therefore be continuous in the circumferential direction between the support members.

In a further unclaimed embodiment each crown segment comprises a first side and a second side opposite to the first side in the circumferential direction, wherein each support member comprises a first guide surface and a second guide surface opposite to the first guide surface in the circumferential direction, wherein the first guide surface and the second guide surface are arranged for abutting the first side of one of the plurality of crown segments and the second side of a directly adjacent one of the plurality of crown segments, respectively. Each support member can therefore be sandwiched in the circumferential direction between a pair of adjacent crown segments.

In a further unclaimed embodiment the first guide surface and the second guide surface are flat or substantially flat. The guide surfaces can thus effectively guide the crown segments.

In a preferred embodiment one or more of the plurality of support members are shaped as a guide rail to engage a respective one of the one or more guide channels. The guide rail can effectively guide the crown segments in the crown-up direction.

In an embodiment thereof each guide channel is arranged to receive a respective one of the guide rails in a direction parallel to the crown-up direction, wherein the guide rails prevent movement of the respective crown segment in a direction transverse or perpendicular to said crown-up direction. The freedom of movement of the crown segments relative to the guide rails can thus be limited to a movement in the crown-up direction.

In another embodiment the tire building drum comprises an intermediate member between the crown section and the bead-lock section, wherein the intermediate member comprises a run-on surface that faces the plurality of crown segments and that extends parallel to the crown-up direction, wherein each crown segment comprises a slide surface That extends parallel to the crown-up direction to slide over the run-on surface in said crown-up direction.

In a preferred embodiment thereof the plurality of support members additionally extend into an area between radial plane and the run-on surface when the crown segments are in the crown-down position. Hence, the support provided by the support members can be extended from the gap between the shoulder and the radial plane to the opposite side of said radial plane and towards and/or up to the run-on surface.

In a further embodiment thereof, the plurality of support members are connected to the run-on surface. Hence, the support members can be positioned accurately and/or rigidly relative to the base or form part of said base.

As mentioned before, each crown segment comprises an outer surface that faces outwards in the radial direction. Preferably, the shoulder extends between the outer surface and the slide surface, wherein the shoulder is at least partially rounded between the outer surface and the slide surface. The rounded shoulder can prevent damage to the tire components when the crown segments in the crown-up position. However, the same roundness causes the gap between the shoulder and the radial plane. The support members can effectively support the tire components in said gap in the aforementioned manner.

In another preferred embodiment the tire building drum further comprises a sleeve that extends around the plurality of crown segments in the circumferential direction, wherein the sleeve extends in the axial direction over the gap, wherein the plurality of support members are arranged to at least partially support the sleeve at the gap when the plurality of crown segments are in the crown-down position. Because of the presence of the support members in the gap, the sleeve can extend more smoothly over the gap. The sleeve spans the parts of the gap that are not occupied by the support members and can thus further reduce the risk of the tire building drum leaving imprints in the tire components.

According to a second aspect, the invention provides a method for tire building with the use of a tire building drum according to any one of the aforementioned embodiments, wherein the method comprises the steps of moving the plurality of crown segments into the crown-down position to receive one or more tire components; and supporting the one or more tire components on the plurality of support members at the gap when the plurality of crown segments are in the crown-down position.

The method relates to the practical implementation of the tire building drum according to the first aspect of the invention and thus has the same technical advantages, which will not be repeated hereafter.

In a preferred embodiment the method further comprises the step of providing a sleeve around the plurality of crown segments in the circumferential direction and extending in the axial direction over the gap; supporting the one or more tire components on the sleeve; and at least partially supporting the sleeve on the plurality of support members at the gap when the plurality of crown segments are in the crown-down position.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 3 (left) and FIG. 4 (right) show partial cross sections according to lines in FIG. 1 and line IV-IV in FIG. 2, respectively;

FIGS. 5 and 6 show partial isometric views of the crown segments in the crown-down position of FIG. 1 and the crown-up position of FIG. 2, respectively;

DETAILED DESCRIPTION OF THE INVENTION

FIGS. 1-7 show a tire building drum 1, in particular a crown drum, according to a first exemplary embodiment of the invention.

Figure 1:
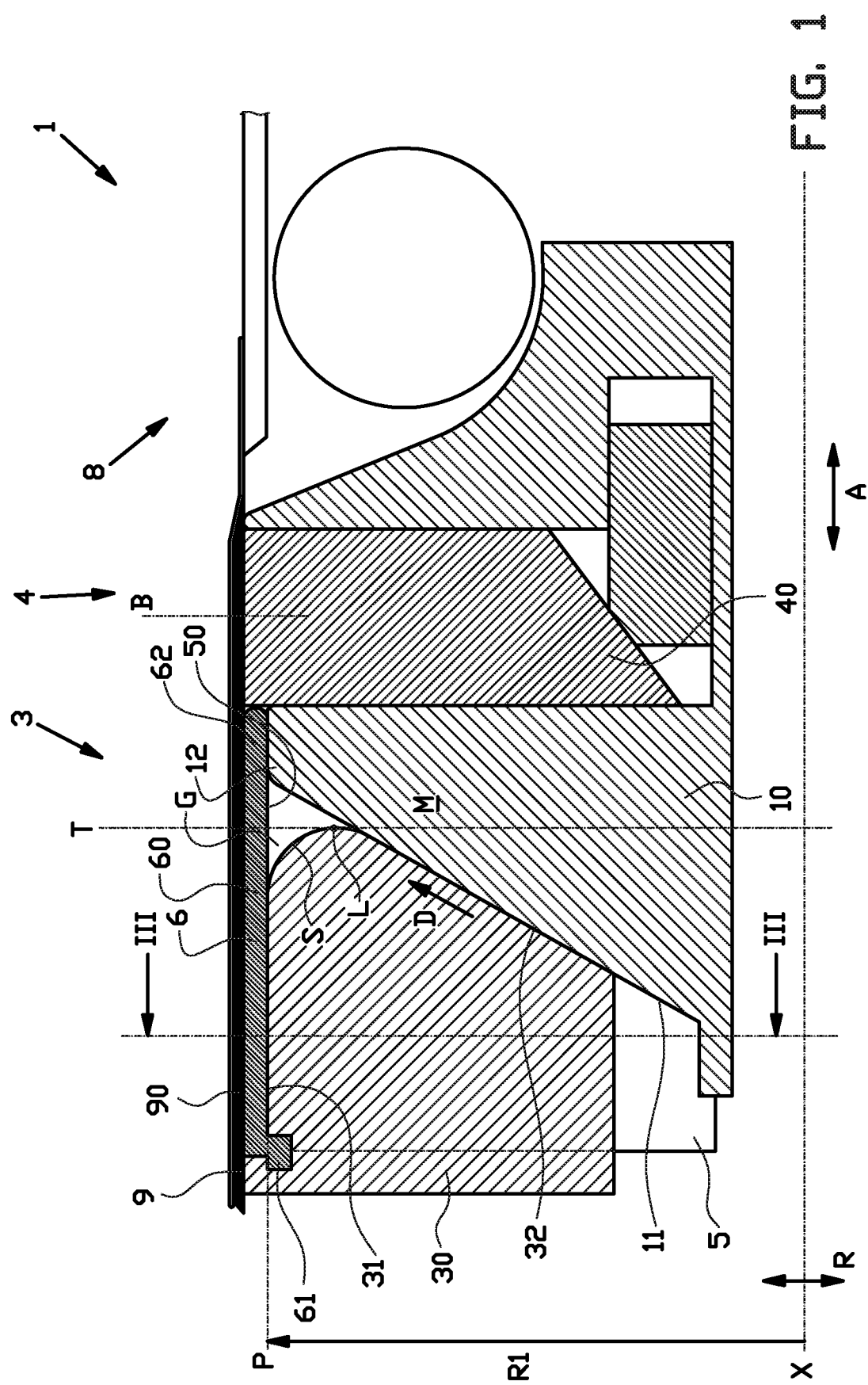
FIGS. 1 and 2 show partial cross sections of a tire building drum according to a first embodiment of the invention, comprising a crown section with a plurality of crown segments in a crown-down position and a crown-up position, respectively.
Figure 2:
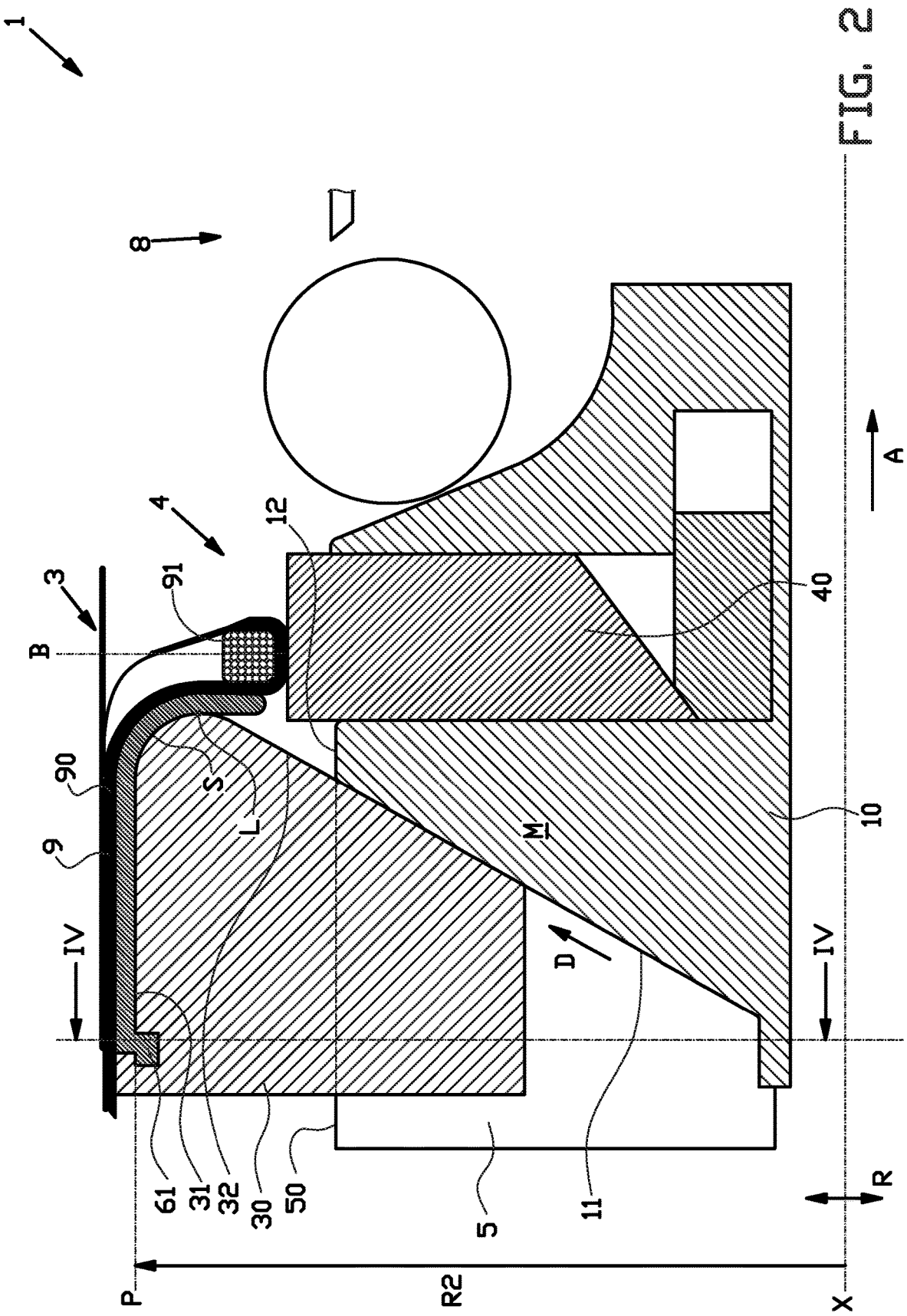

The tire building drum 1 is rotatable about a central axis X extending in an axial direction A. The tire building drum 1 is expandable in a radial direction R perpendicular to the central axis X. In FIGS. 1 and 2, only the part of the tire building drum 1 above the central axis X is shown. However, as clearly shown in FIGS. 3 and 4, the tire building drum 1 extends in a circumferential direction C about the central axis X.

The tire building drum 1 can be used for single-stage tire building, i.e. a tire building method in which one or more tire components 9, in particular a carcass 90 and a bead 91, are build, shaped and assembled on the same tire building drum. For this purpose, the tire building drum 1 comprises a crown section 3 for shaping a carcass 90 and a bead-lock section 4 for retaining a bead 91 to the carcass 90 at a bead-lock position B. The bead-lock section 4 comprises a plurality of bead-lock segments 40 which are movable in the radial direction R to engage and/or release the bead 91. In this exemplary embodiment, the tire building drum 1 further comprises a turn-up section 8, known per se, for turning up a part of the carcass 90 around the bead 91 against the shaped part of the carcass at the crown section 3. The bead-lock section 4 is located at a side of or adjacent to the crown section 3 in the axial direction A. The turn-up section 8 is located in the axial direction A at a side of the bead-lock section 4 facing away from the crown section 3.

As best seen in FIG. 1, the tire building drum 1 comprises a base 10 for supporting parts of the crown section 3, the bead-lock section 4 and/or the turn-up section 8. In this exemplary embodiment, the base 10 forms an intermediate member M that extends between the crown section 3 and the bead-lock section 4 in the axial direction A. The base 10 is further provided with a run-on surface 11 at the intermediate member M for guiding parts of the crown section 3 in a manner that will be described in more detail hereafter. The run-on surface 11 faces the crown section 3. The base 10 is arranged to be fitted concentrically to a drum shaft (not shown) extending in the axial direction A at the central axis X.

Figure 6:
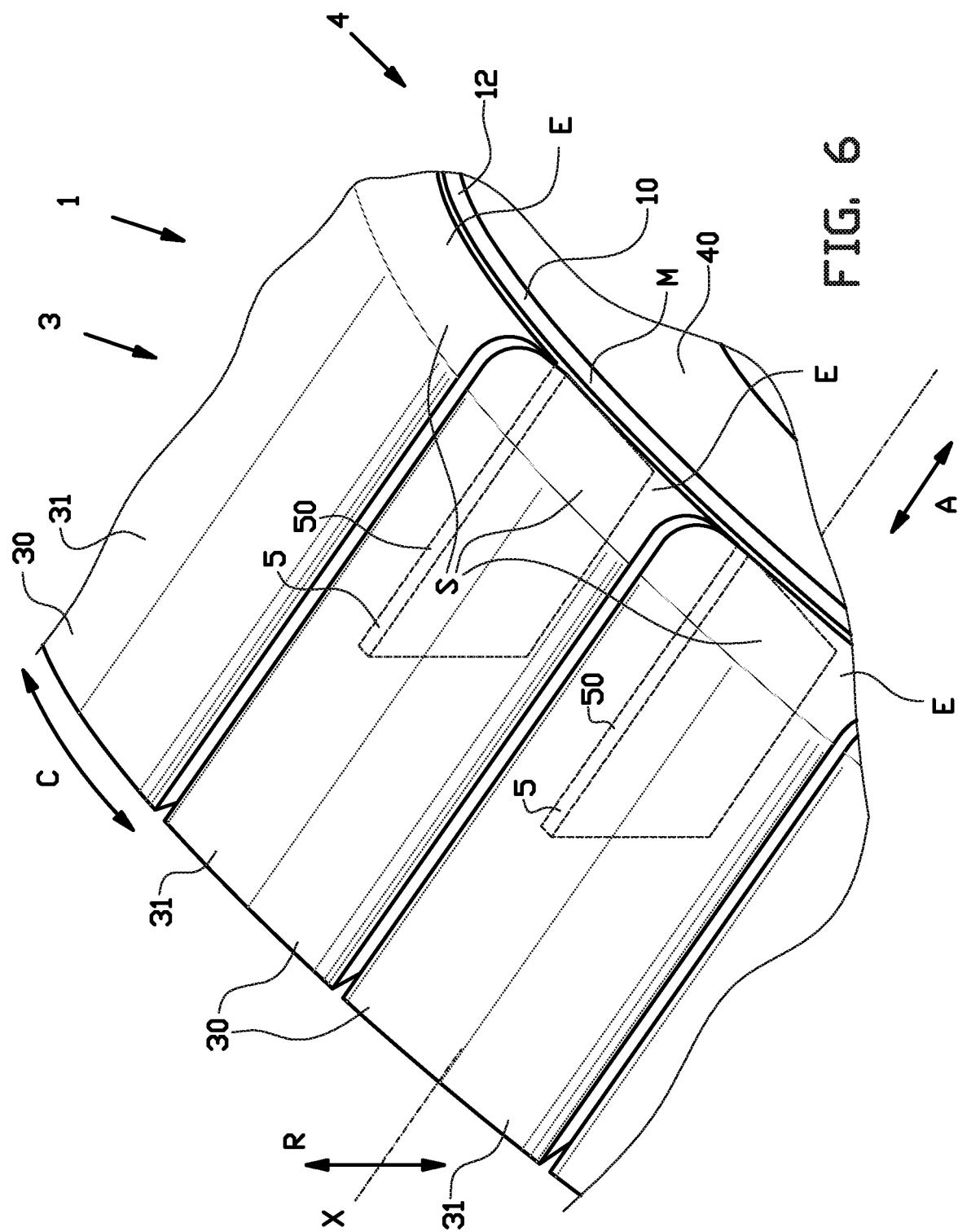

As best seen in FIGS. 3 and 4, the crown section 3 comprises a plurality of crown segments 30 distributed in a circumferential direction C about the central axis X. The crown segments 30 are movable with respect to the base 10 from a crown-down position, as shown in FIGS. 1, 3 and 5, into a crown-up position, as shown in FIGS. 2, 4 and 6. The movement of the crown segments between the crown-down position and the crown-up position is a movement in a crown-up direction D with at least a vector-component in the radial direction R. In this exemplary embodiment, the crown-up direction D is offset with respect to the radial direction R at a sharp oblique angle. Alternatively, the crown-up direction D may be closer to or even parallel to the radial direction R. Preferably, the movement in the crown-up direction D is a linear movement.

As shown in FIGS. 1 and 2, each crown segment 30 comprises an outer surface 31 that faces outwards in the radial direction R to support the one or more tire components 9. In this exemplary embodiment, as shown in FIGS. 5 and 6, the outer surfaces 31 of the crown segments 30 are closed or substantially closed to provide an even surface for directly or indirectly supporting the carcass 90. Preferably, the outer surface 31 extends parallel or substantially parallel to the axial direction A. Together, the outer surfaces 31 of the plurality of crown segments 30 form a crown surface P extending in the circumferential direction C to directly or indirectly support the carcass 9 at the crown section 3 during the shaping of said carcass 90. Preferably, the crown surface P is a cylindrical or straight cylindrical surface. The crown surface P extends at a crown-down radius R1 when the crown segments 30 are in the crown-down position of FIG. 1 and at a crown-up radius R2, greater than the crown-down radius R1, when the crown segments 30 are in the crown-up position of FIG. 2.

The crown segments 30 together form a leading edge L of the crown section 3. The leading edge L is 'leading' in the sense that it is formed by the ends of the crown segment 30 that faces in and/or protrudes most forward in the axial direction A towards the run-on surface 11 and/or the bead-lock section 4 when the crown segment 30 is in the crown-down position, as shown in FIG. 1. The leading edge L extends in a radial plane T perpendicular to the central axis X. Said radial plane T is continuous and/or tangent to the crown segments 30 at the side of the crown segments 30 that face the bead-lock section 4.

The crown segments 30 together form a shoulder S that defines, at least partially, the transition from the crown surface P to the leading edge L of the crown segments 30.

As shown in FIGS. 1 and 2, the crown segment 30 further comprises a slide surface 32 that extends parallel to the crown-up direction D. The run-on surface 11 of the base 10 faces the slide surface 32 of the crown segment 30 and extends at the same crown-up direction D. The crown segment 30 is arranged to slide in the crown-up direction D over the run-on surface 11 of the intermediate member M from the crown-down position into the crown-up position. The shoulder S extends between the outer surface 31 and the slide surface 32 of each crown segment 30. In this example, the shoulder S is rounded between the outer surface 31 and the slide surface 32 to form a smooth transition between the respective surfaces 31, 32. In particular, the rounded shoulder S provides a smooth transition from the outer surface 31 extending in the axial direction A to the slide surface 32 extending in the crown-up direction D. In this exemplary embodiment, the shoulder S is completely rounded.

Alternatively, the shoulder S may be at least partially rounded, i.e. with one or more non-circular features.

When the crown segments 30 are moved in the crown-up direction D from the crown-down position towards and/or into the crown-up position, the shoulder S is expanded in diameter. The carcass 90 is shaped around the shoulder S. In particular, the shoulder S defines the transition between a radial side of the shaped carcass 90 and a circumferential tread of the carcass 90. The roundness of the shoulder S prevents that the crown segments 30 damage the carcass 90 during the shaping, in particular in the crown-up position.

As best seen in FIG. 1, the roundness of the shoulder S as a whole causes a gap G between the crown segments 30 and the radial plane T in the axial direction A when the crown segments 30 are in the crown-down position. In particular, the shoulder S drops away from the respective outer surfaces 31 of the crown segments 30 in radially inward direction, i.e. towards the central axis X. In this exemplary embodiment, the gap G is part of an area or rest space in the axial direction A between the at least partially rounded shoulder S and a top end 12 of the run-on surface 11 of the intermediate member M.

As shown in FIGS. 3 and 4, each crown segment 30 comprises a first side 33 and a second side 34 opposite to the first side 33 in the circumferential direction C. Preferably, the sides 33, 34 of directly adjacent crown segments 30 are placed as close as possible together in the circumferential direction C, as the spacing between them in the circumferential direction C will only increase with the movement of said crown segments 30 in the crown-up direction D between the crown-down position, as shown in FIG. 3, and the crown-up position, as shown in FIG. 4.

As further shown in FIGS. 3 and 4, the tire building drum 1 according to the invention is provided with a plurality of support members 5 distributed in the circumferential direction C. In this exemplary embodiment, each support member 5 extends, considered in the circumferential direction C, between two directly adjacent crown segments 30. More in particular, each support member 5 comprises a first guide surface 51 and a second guide surface 52 opposite to the first guide surface 51 in the circumferential direction C. The first guide surface 51 and the second guide surface 52 are arranged for abutting the first side 33 of one of the plurality of crown segments 30 and the second side 34 of a directly adjacent one of the plurality of crown segments 30, respectively. As such, the guide surfaces 51, 52 can guide the respective sides 33, 34 of the crown segments 30 in the crown-up direction D. Preferably, the guide surfaces 51, 52 are flat or substantially flat.

When comparing FIGS. 1 and 2, it is noted that the support members 5 remain in place while the crown segments 30 are move in the crown-up direction D from the crown-down position into the crown-up position. In other words, the support members 5 are fixed in the radial direction R relative to the base 10 and/or the central axis X. The crown segments 30 are thus movable in the crown-up direction D relative to the plurality of support members 5.

As best seen in FIG. 5, the support members 5 extend in, into or through the gap G between should edge S and the radial plane T. More in particular, the support members 5 extend through the gap G in or parallel to the axial direction A. As shown in FIGS. 1 and 2, each support member 5 comprises a support surface 50 for directly or indirectly supporting the one or more tire components 9. Preferably, the support surface 50 extends parallel or substantially parallel to the axial direction A. In this exemplary embodiment, the support surface 50 extends into the gap G as a continuation of the crown surface P when the plurality of crown segments 30 are in the crown-down position. More in particular, the support surface 50 extends in the gap G at the same crown-down radius R1 as the crown segments 30 in the crown-down position.

Preferably, the plurality of support members 5 additionally extend into the area between radial plane T and the run-on surface 11 when the crown segments 30 are in the crown-down position. In other words, the support provided by the support members 5 can be extended from the gap G between the shoulder S and the radial plane T to the opposite side of said radial plane T and towards and/or up to the run-on surface 11.

Consequently, the support members 5 can at least partially support the one or more tire components 9 on the tire building drum 1 at the location of the gap G when the crown segments 30 are in the crown-down position. Hence, the negative effects of the gap G on the one or more tire components 9 can be reduced. In particular, imprints as a result of the gap G can be reduced or prevented all together. Consequently, the tire quality can be improved.

In this exemplary embodiment, as shown in FIGS. 3 and 4, the tire building drum 1 further comprises a sleeve 6 that extends around the plurality of crown segments 30 in the circumferential direction C. In the crown-up position of FIG. 4, the sleeve 6 is solely supported by the crown segments 30. In this position, the sleeve 6 can reduce imprints on the one or more tire components 9 as a result of the spacing between the crown segments 30 in the circumferential direction C. Because of the presence of the sleeve 6, the one or more tire components 9 are not supported directly on the crown segments 30. Instead, they are supported directly on the sleeve 6, and indirectly by the crown segments 30 beneath the sleeve 6.

Figure 7:
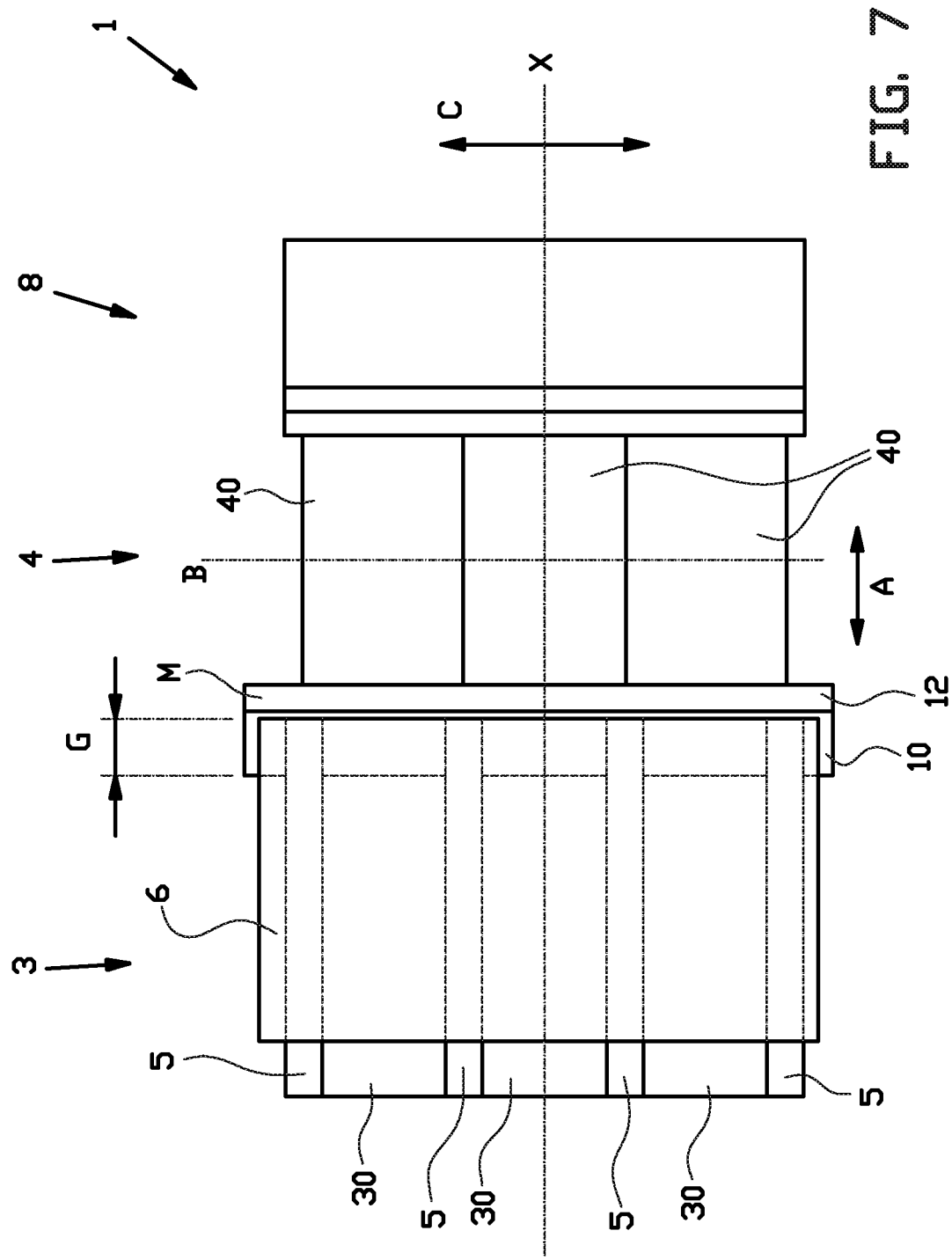
FIG. 7 shows a partial top view of tire building drum according to FIG. 1.

Note that in the crown-down position of FIGS. 3 and 7, the sleeve 6 is supported in between the crown segments 30 by the support members 5. Consequently, the combination of the crown segments 30 and the support members 5 can effectively form a substantially continuous circumferential surface in the circumferential direction C.

In this exemplary embodiment, as shown in FIG. 1, the support members 5 support the sleeve 6 in the gap G as well. The support members 5 can reduce slacking of the sleeve 6 in the gap G and/or allow the sleeve 6 to extend more smoothly over any remaining parts of the gap G that are not occupied by the support members 5. Because of the presence of the sleeve 6, the one or more tire components 9 are not supported directly on the support members 5. Instead, they are supported directly on the sleeve 6, and indirectly by the support members 5 beneath the sleeve 6.

As shown in FIG. 1, the sleeve 6 comprises a first circumferential edge 61, a second circumferential edge 62 opposite to the first circumferential edge 61 in the axial direction A and a sleeve body 60 extending between the first circumferential edge 61 and the second circumferential edge 62. The sleeve body 60 extends at least partially over the gap G in the axial direction A when the crown segments 30 are in the crown-down position of FIG. 1. The sleeve 6 is thus at least partially supported by the support members 5 at the gap G.

As shown in FIG. 2, the sleeve 6 has a length that can be fully or completely supported by the crown segments 30 in the crown-up position. In particular, the second circumferential edge 62 is arranged to lie on the shoulder S formed by the crown segments 30. In the crown-down position of FIG. 1, the second circumferential edge 62 is arranged to rest on the support members 5 in the gap G and/or on the top end 12 of the intermediate member M just outside of the gap G.

A method for tire building with the use of the aforementioned tire building drum 1 will be elucidated below with reference to FIGS. 1-7.

The method comprises the steps of moving the plurality of crown segments 30 into the crown-down position to receive the one or more tire components 9 and supporting the one or more tire components on the plurality of support members 5 at the gap G when the plurality of crown segments are in the crown-down position. Optionally, the tire building drum 1 is provided with the sleeve 6, in which case the one or more tire components 9 are supported on the sleeve 6. Said sleeve 6 is at least partially supported on the plurality of support members 5 at the gap G when the plurality of crown segments 30 are in the crown-down position. As mentioned before, the sleeve 6 may be provided with a second circumferential edge 62 that is arranged to freely slide over the bead-lock section 4 and/or the crown section 3 in response to the movement of the crown segments 30 in the crown-up direction D.

Figure 8:
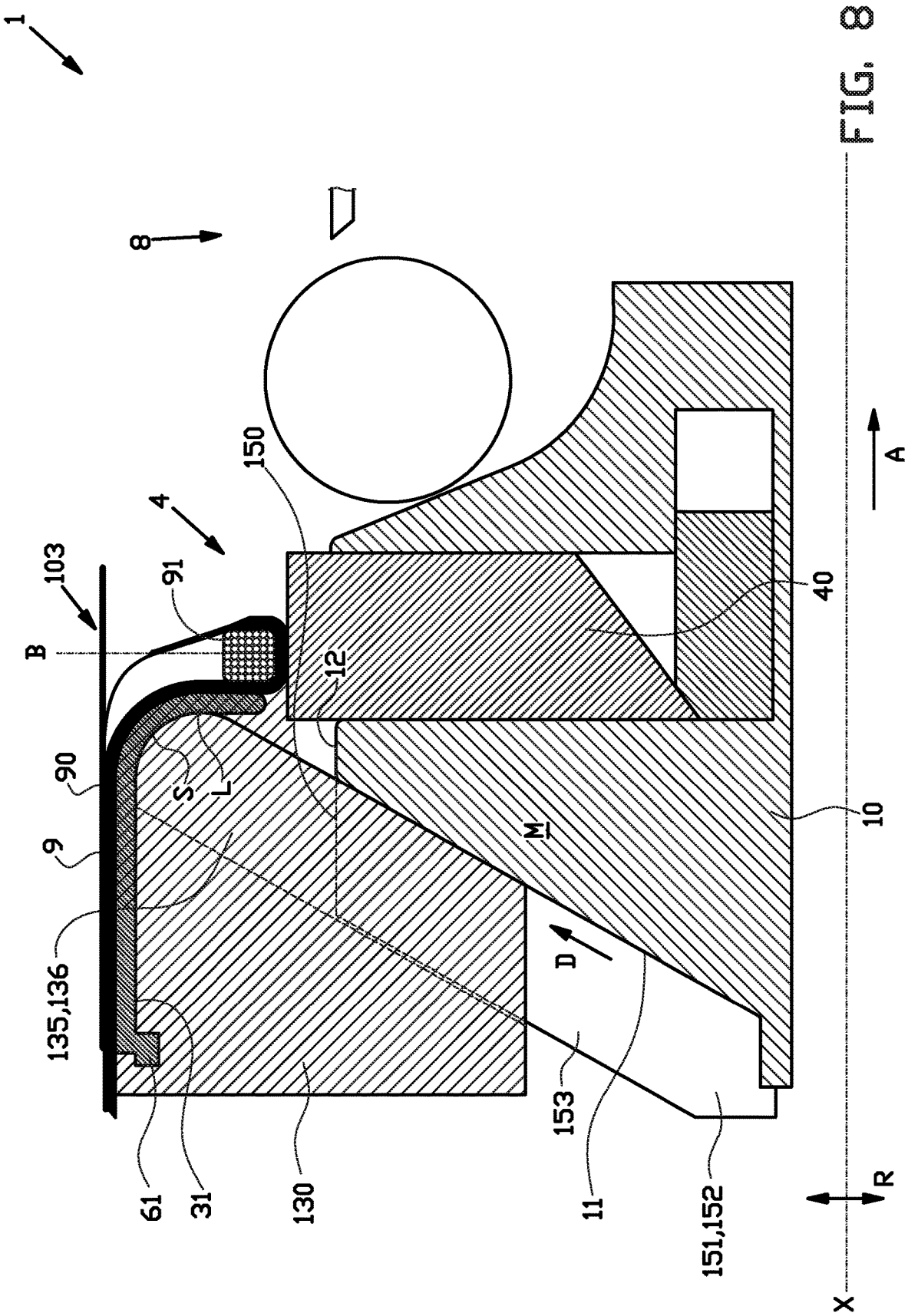
FIG. 8 shows a partial cross section of an alternative tire building drum according to a second embodiment of the invention.
Figure 9:
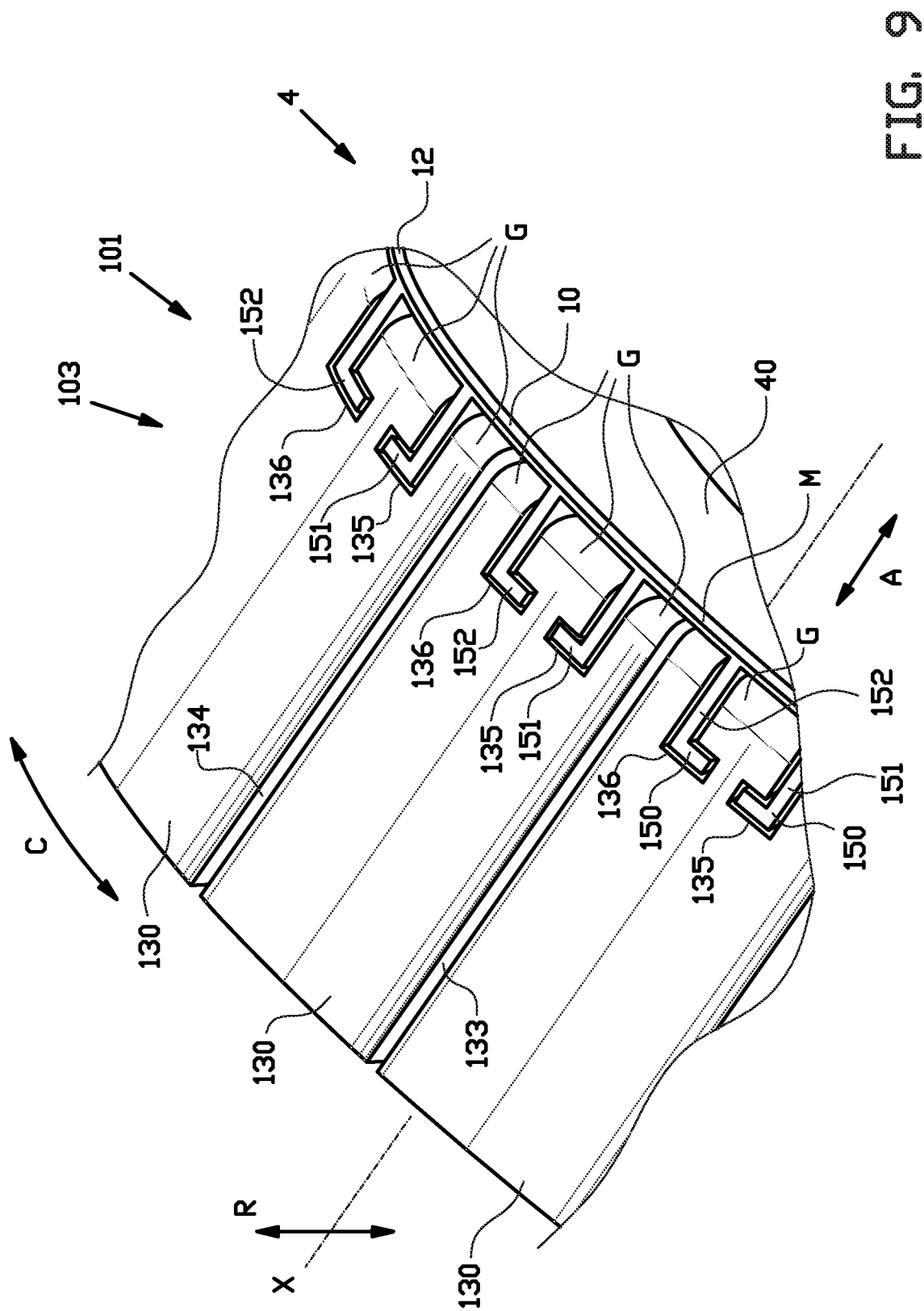
FIGS. 9 and 10 show partial isometric views of the alternative tire building drum according to FIG. 8, with alternative crown segments in the crown-down position and the crown-up position, respectively.
Figure 10:
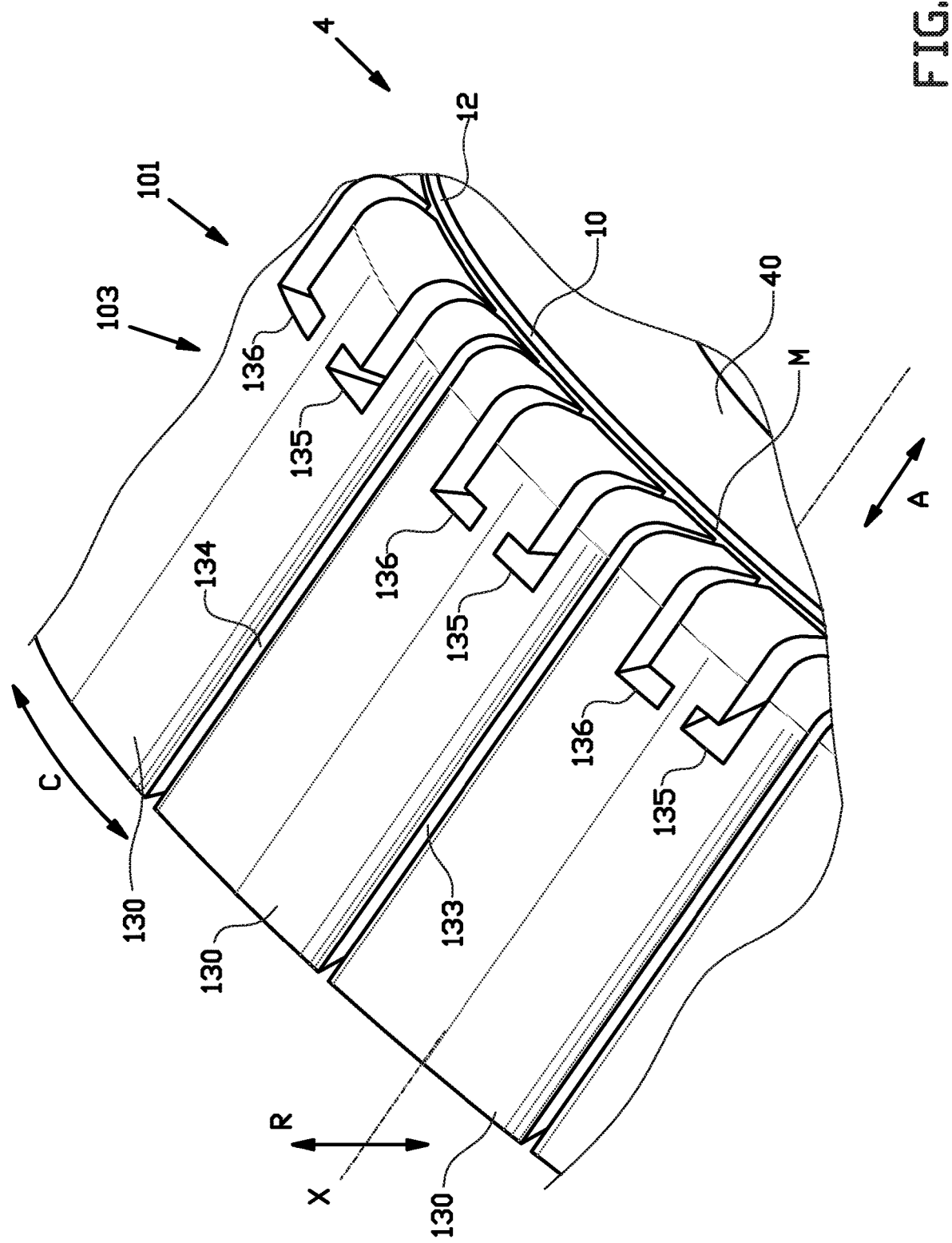

FIGS. 8, 9 and 10 show an alternative tire building drum 101 according to a second embodiment of the invention. The alternative tire building drum 101 differs from the previously discussed tire building drum 1 in that it is provided with alternative crown segments 130 and one or more alternative support members 151, 152.

The alternative crown segments 130 differ from the previously discussed crown segments 30 in that it has a first side 133, a second side 134 opposite to the first side 133 in the circumferential direction C and one or more guide channels 135, 136 for receiving one of the one or more alternative support members 151, 152 in the respective alternative crown segment 130 between the first side 133 and the second side 134. Hence, in absence of support members between the alternative crown segments 130, the sides 133, 134 of said alternative crown segments 130 can be placed closer together in the circumferential direction C. Preferably, each alternative crown segment 130 is provided with two or more guide channels 135, 136 to receive two or more support members 151, 152.

Just like the previously discussed support members 5, the alternative support members 151, 152 each form a support surface 150 for supporting the one or more tire components 9 directly or indirectly, via the sleeve 6, in substantially the same way as previously discussed. However, the support surfaces 150 are now formed at the position of the guide channels 135, 136 instead of between the crown segments 130.

In this exemplary embodiment, each alternative support member 151, 152 is shaped as a guide rail 153 to engage a respective one of the guide channels 135, 136. Preferably, the guide rail 153 has a cross-section in a direction perpendicular to the crown-up direction D that matches or is complementary to the cross-section of the guide channel 135, 136 in the same perpendicular direction. More in particular, both the guide rail 153 and the guide channel 135, 136 are arranged to engage each other or interlock in a way that only allows movement of the alternative crown segment 130 relative to the alternative support member 151, 152 in the crown-up direction D. In this specific example, the guide channel 135, 136 and the alternative support member 151, 152 are both L-shaped, wherein the transverse part of the L-shape prevents movement of the respective segment 130 with respect to the guide rails 153 in a direction transverse or perpendicular to the crown-up direction D. Hence, the position of the alternative crown members 130 relative to the alternative support members 151, 152 can be controlled more accurately.

It is to be understood that the above description is included to illustrate the operation of the preferred embodiments and is not meant to limit the scope of the invention.

From the above discussion, many variations will be apparent to one skilled in the art that would yet be encompassed by the scope of the present invention.

For example, both previously discussed embodiments may be combined to arrive at a further alternative tire building drum (not shown) with a crown segment that has one or more guide channels, one or more support members engaging with the one or more guide channels and one or more supports members between the crown segments in the circumferential direction.

LIST OF REFERENCE NUMERALS 1 tire building drum
10 base
11 run-on surface
12 top end
3 crown section
30 crown segment
31 outer surface
32 slide surface
33 first side
34 second side
4 bead-lock section
40 bead-lock segment
5 support member
50 support surface
51 first guide surface
52 second guide surface
6 sleeve
60 sleeve body
61 first circumferential edge
62 second circumferential edge
8 turn-up section
9 one or more tire components
90 carcass
91 bead
101 alternative drum
103 alternative crown segment
133 first side
134 second side
135 guide channel
136 guide channel
150 support surface
151 alternative support member
152 alternative support member
153 guide rail
A axial direction
B bead-lock position
C circumferential direction
D crown-up direction
G gap
L leading edge
M intermediate member
P crown surface
R radial direction
R1 crown-down radius
R2 crown-up radius
S shoulder
T radial plane
X central axis

The invention claimed is:

1. A tire building drum comprising a base that is rotatable about a central axis extending in an axial direction, wherein the tire building drum is provided with a crown section and a bead-lock section adjacent to the crown section in the axial direction, wherein the crown section comprises a plurality of crown segments distributed in a circumferential direction about the central axis and movable with respect to the base and the bead-lock section from a crown-down position into a crown-up position in a crown-up direction with at least a vector-component in a radial direction perpendicular to the central axis, wherein the crown segments together form a crown surface facing outwards in the radial direction, a leading edge facing towards the bead-lock section in the axial direction when the crown segments are in the crown-down position and a shoulder that defines the transition from the crown surface to the leading edge, wherein the leading edge extends in a radial plane perpendicular to the central axis, wherein the shoulder leaves a gap between the plurality of crown segments and the radial plane in the axial direction, wherein the tire building drum further comprises a plurality of support members distributed in the circumferential direction and extending in said gap when the crown segments are in the crown-down position, wherein each crown segment comprises a first side and a second side opposite to the first side in the circumferential direction, wherein each crown segment further comprises one or more guide channels, wherein each guide channel is arranged for receiving a respective one of the plurality of support members in the respective crown segment between the first side and the second side.

2. The tire building drum according to claim 1, wherein the plurality of support members extend through the gap in the axial direction.

3. The tire building drum according to claim 1, wherein each crown segment comprises an outer surface that faces outwards in the radial direction, wherein the outer surfaces of the plurality of crown segments together form the crown surface, wherein each support member forms a support surface that extends into the gap as a continuation of the crown surface when the plurality of crown segments are in the crown-down position.

4. The tire building drum according to claim 3, wherein the crown surface extends at a crown-down radius with respect to the central axis, wherein the support surface extends at the same crown-down radius in the gap.

5. The tire building drum according to claim 3, wherein the support surface extends parallel to the axial direction.

6. The tire building drum according to claim 1, wherein the plurality of support members are fixed in the radial direction relative to the base, wherein the plurality of crown segments are movable in the crown-up direction relative to the plurality of support members.

7. The tire building drum according to claim 1, wherein the plurality of support members are arranged for guiding the movement of the plurality of crown segments in the crown-up direction.

8. The tire building drum according to claim 1, wherein one or more of the plurality of support members are shaped as a guide rail to engage a respective one of the one or more guide channels.

9. The tire building drum according to claim 8, wherein each guide channel is arranged to receive a respective one of the guide rails in a direction parallel to the crown-up direction, wherein the guide rails prevent movement of the respective crown segment in a direction transverse or perpendicular to said crown-up direction.

10. The tire building drum according to claim 1, wherein the tire building drum comprises an intermediate member between the crown section and the bead-lock section, wherein the intermediate member comprises a run-on surface that faces the plurality of crown segments and that extends parallel to the crown-up direction, wherein each crown segment comprises a slide surface that extends parallel to the crown-up direction to slide over the run-on surface in said crown-up direction.

11. The tire building drum according to claim 10, wherein the plurality of support members additionally extend into an area between radial plane and the run-on surface when the crown segments are in the crown-down position.

12. The tire building drum according to claim 11, wherein the plurality of support members are connected to the run-on surface.

13. The tire building drum according to claim 11, wherein each crown segment comprises an outer surface that faces outwards in the radial direction, wherein the shoulder extends between the outer surface and the slide surface, wherein the shoulder is at least partially rounded between the outer surface and the slide surface.

14. The tire building drum according to claim 1, wherein the tire building drum further comprises a sleeve that extends around the plurality of crown segments in the circumferential direction, wherein the sleeve extends in the axial direction over the gap, wherein the plurality of support members are arranged to at least partially support the sleeve at the gap when the plurality of crown segments are in the crown-down position.

15. A method for tire building with the use of a tire building drum according to claim 1, wherein the method comprises the steps of:
    moving the plurality of crown segments into the crown-down position to receive one or more tire components; and
    supporting the one or more tire components on the plurality of support members at the gap when the plurality of crown segments are in the crown-down position.

16. The method according to claim 15, wherein the method further comprises the step of:
    providing a sleeve around the plurality of crown segments in the circumferential direction and extending in the axial direction over the gap;
    supporting the one or more tire components on the sleeve; and
    at least partially supporting the sleeve on the plurality of support members at the gap when the plurality of crown segments are in the crown-down position.

* * * * *